United States Patent
Peterson et al.

(10) Patent No.: US 6,922,595 B1
(45) Date of Patent: Jul. 26, 2005

(54) SELECTING CONTROL ALGORITHMS BASED ON BUSINESS RULES

(75) Inventors: Anastasia O. Peterson, Austin, TX (US); Michael L. Miller, Cedar Park, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 22 days.

(21) Appl. No.: 10/134,107

(22) Filed: Apr. 29, 2002

(51) Int. Cl.[7] .................. G06F 19/00; G06F 11/30; G06F 15/00; G06F 17/00; G05B 13/02
(52) U.S. Cl. .................. 700/40; 700/108; 702/184
(58) Field of Search .................. 700/108–111, 121, 700/40; 702/184

(56) References Cited

U.S. PATENT DOCUMENTS

| | | | |
|---|---|---|---|
| 6,197,604 B1 * | 3/2001 | Miller et al. | 438/14 |
| 6,216,054 B1 * | 4/2001 | Jang et al. | 700/121 |
| 6,246,972 B1 * | 6/2001 | Klimasauskas | 703/2 |
| 6,444,037 B1 * | 9/2002 | Frankel et al. | 118/715 |
| 6,449,524 B1 * | 9/2002 | Miller et al. | 700/121 |
| 6,564,171 B1 * | 5/2003 | Peterson et al. | 702/182 |
| 6,587,744 B1 * | 7/2003 | Stoddard et al. | 700/121 |
| 6,594,589 B1 * | 7/2003 | Coss et al. | 702/34 |

\* cited by examiner

Primary Examiner—Leo Picard
Assistant Examiner—Ryan Jarrett
(74) Attorney, Agent, or Firm—Williams, Morgan & Amerson, P.C.

(57) ABSTRACT

A method and apparatus is provided for selecting control algorithms based on business rules. The method comprises processing a workpiece using a processing tool. The processing tool is capable of processing the workpiece under a control of at least a first and a second control algorithm. The method further comprises detecting an occurrence of an event that affects an operation of the processing tool, selecting at least one of the first and second control algorithm based on detecting the occurrence of the event and processing a workpiece using the processing tool in accordance with the selected control algorithm.

20 Claims, 3 Drawing Sheets

SELECTING CONTROL ALGORITHMS BASED ON BUSINESS RULES

BACKGROUND OF THE INVENTION

1. Field of the Invention

This invention relates generally to a semiconductor fabrication process, and, more particularly, to selecting control algorithms based on business rules to control a processing tool or process in the semiconductor fabrication process.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in continual improvements in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

During the fabrication process, various events may take place that affect the performance of the devices being fabricated. That is, variations in the fabrication process steps result in device performance variations. Factors, such as feature critical dimensions, doping levels, contact resistance, particle contamination, etc., all may potentially affect the end performance of the device. Various tools in the processing line are controlled, in accordance with performance models, to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., all of which equate to increased profitability.

Generally, a set of processing steps is performed on a group of semiconductor wafers, sometimes referred to as a "lot," using a variety of processing tools, including photolithography steppers, etch tools, deposition tools, polishing tools, rapid thermal processing tools, implantation tools, etc. The technologies underlying semiconductor-processing tools have attracted increased attention over the last several years, resulting in substantial refinements. However, despite the advances made in this area, many of the processing tools that are currently commercially available suffer certain deficiencies. In particular, such tools often lack the ability to quickly and efficiently recover from selected events that may cause the output of the tools to deviate from the target results. For example, preventative maintenance events may cause the output of the tools to deviate, at least transitorily, thereby adversely affecting the end results. These deficiencies can engender non-optimal control of critical processing parameters, such as throughput, accuracy, stability and repeatability, processing temperatures, mechanical tool parameters, and the like. This variability may manifest itself as within-run disparities, run-to-run disparities and tool-to-tool disparities that can propagate into deviations in product quality and performance.

The present invention is directed to overcoming, or at least reducing the effects of, one or more of the problems set forth above.

SUMMARY OF THE INVENTION

In one embodiment of the present invention, a method is provided for selecting control algorithms based on business rules. The method comprises processing a workpiece using a processing tool. The processing tool is capable of processing the workpiece under a control of at least a first and a second control algorithm. The method further comprises detecting an occurrence of an event that affects an operation of the processing tool, selecting at least one of the first and second control algorithm based on detecting the occurrence of the event and processing a workpiece using the processing tool in accordance with the selected control algorithm.

In another embodiment of the present invention an apparatus is provided for selecting control algorithms based on business rules. The apparatus comprises a control unit communicatively coupled to an interface. The control unit is adapted to operate a processing tool in accordance with a business rule, select a control algorithm to control the operation of the processing tool based on the business rule and process a workpiece in the processing tool in accordance with the selected control algorithm.

In a further embodiment of the present invention, an article comprising one or more machine-readable storage media containing instructions is provided for selecting control algorithms based on business rules. The one or more instructions, when executed, enable the processor to process a workpiece using a processing tool under a control of a first control algorithm, detect an occurrence of an event that affects an operation of the processing tool and select a second control algorithm based on detecting the occurrence of the event. The instructions further enable the processor to process a workpiece in the processing tool under a control of the second control algorithm.

BRIEF DESCRIPTION OF THE DRAWINGS

The invention may be understood by reference to the following description taken in conjunction with the accompanying drawings, in which like reference numerals identify like elements, and in which.

Figure 1:
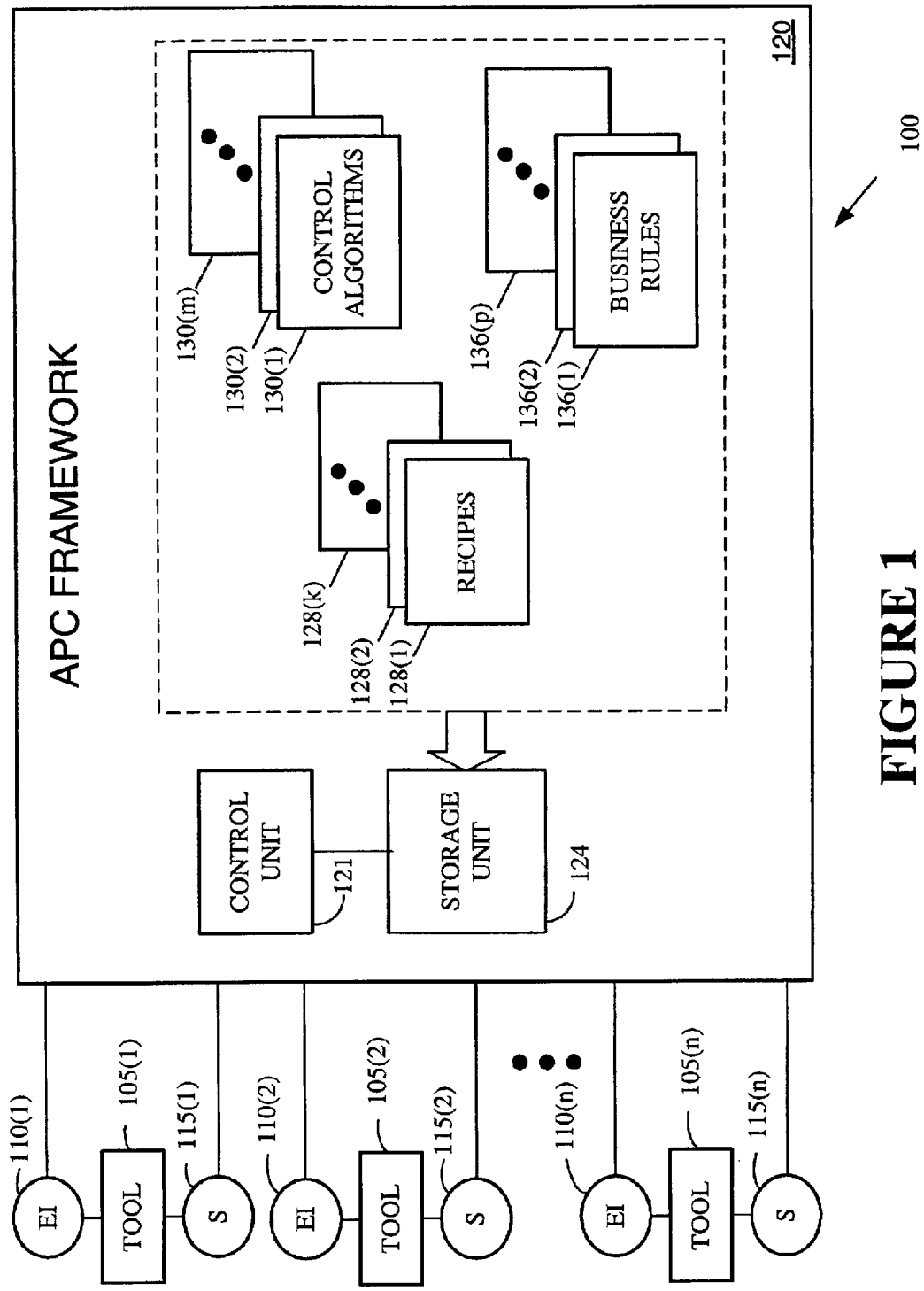
FIG. 1 illustrates a manufacturing system, including an APC framework, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a block diagram of a manufacturing system 100 for a semiconductor fabrication process is illustrated in accordance with one embodiment of the present invention. Although the invention is described as it may be implemented in a semiconductor fabrication facility, the invention is not so limited and may be applied to other manufacturing environments. The techniques described herein may be applied to a variety of workpieces including, but not limited to, microprocessors, memory devices, digital signal processors, application specific integrated circuits (ASICs), or other similar devices. The techniques may also be applied to workpieces other than semiconductor devices.

The system 100 includes a plurality of processing tools 105(1-n) (shown as tools 105(1-n) in FIG. 1). Exemplary processing tools 105(1-n) for a semiconductor device fabrication environment include metrology tools, photolithography steppers, etch tools, deposition tools, polishing tools, rapid thermal processing tools, test-equipment tools, implantation tools, etc. In one embodiment, the processing tool 105 may be a multi-chambered processing tool, where, for example, each chamber may represent a "processing tool" for the purposes of this discussion.

In one embodiment, the processing tools 105(1-n) may be downstream to each other (e.g., the second processing tool 105(2) may be downstream to the first processing tool 105(1), the third processing tool 105(3) may be downstream to the second processing tool 105(2), and so forth). As such, a semiconductor device that is processed by the first processing tool 105(1) may, for example, be provided to the second processing tool 105(2), which may further process the semiconductor device before it is processed by the next processing tool 105(3). This process may continue until the last processing tool 105(n) has completed processing the semiconductor device. In one embodiment, the processing tools 105(1-n) may include one or more chambers (not shown) where each chamber may perform any one or more of the desired processing steps.

The processing tools 105(1-n) of the system 100, in the one embodiment, may perform various processing steps to create an operational semiconductor device. For example, the processing tools 105(1-n) may be used for manufacturing the raw semiconductor material, slicing the semiconductor crystal ingot into individual wafers, fabricating (e.g., etching, doping, ion implanting) the semiconductor wafers, testing and packaging the completed semiconductor devices. The number of processing tools 105(1-n) employed in the system 100 may be implementation specific, and thus, may vary from one embodiment to another depending on the particular processing steps desired.

In the illustrated embodiment, the processing tools 105 (1-n) are coupled to respective equipment interfaces (EI) 110 (shown as EI 110(1-n) in FIG. 1). Each of the equipment interfaces 110 retrieves various operational data, including metrology data, from its respective processing tool 105, and communicates this data to an Advanced Process Control (APC) framework 120 to determine whether the processing tool 105 is experiencing a faulty operation. Each equipment interface 110 may further receive control signals from the APC framework 120 that may be used to control the respective processing tool 105. For example, a control signal from the APC framework 120 may be used to shut down the first processing tool 105(1) if the operational data that was sent by the first equipment interface 110(1) was deemed faulty by the APC framework 120.

The processing tools 105(1-n) may include one or more internal sensors (not shown) for measuring operational data, which may then be transmitted through the associated EI 110 of the processing tools 105(1-n). In addition to internal sensors, the processing tools 105(1-n) may also be coupled to respective external sensors 115 (shown as sensors 115(1-n) in FIG. 1). The sensors 115 measure additional operational data that may or may not be ascertained by the associated processing tool 105 itself. For example, the sensors 115 may be used to determine a temperature range or other environmental or ambient data near or around the associated processing tool 105. In alternative embodiments, the sensors 115 may be used to sense various other operational parameters associated with the processing tool 105, and; thus, need not be limited to the aforementioned examples. It should be appreciated that, in one embodiment, the sensors 115 may also be integrated within the processing tools 105(1-n) themselves.

The sensor 115 may be embodied as a simple data acquisition program, such as a C++ standalone program acquiring data from a thermocouple wire, for example. Alternatively, the sensor 115 may be embodied as a full-fledged LABVIEW application, acquiring data through multiple transducers (not shown). It will further be appreciated that the sensor 115 need not be used at all, and the APC framework 120 may rely upon the operational data forwarded from the equipment interface 110. If used, in one embodiment, the sensor 115 forwards the additional operational data to the APC framework 120 for analysis.

The APC framework 120 may be any one of a variety of arrangements that facilitates communications to and from the processing tools 105(1-n). In one embodiment, the Advanced Process Control (APC) framework 120 may be implemented, in part, using the Catalyst system offered by KLA-Tencor, Inc. The Catalyst system uses Semiconductor Equipment and Materials International (SEMI) Computer Integrated Manufacturing (CIM) Framework compliant system technologies. CIM (SEMI E81-4699—Provisional Specification for CIM Framework Domain Architecture) and APC (SEMI E93-0999—Provisional Specification for CIM Framework Advanced Process Control Component) specifications are publicly available from SEMI.

In one embodiment, the APC framework 120 may include a control unit 121 that manages the communications to and from the APC framework 120. The control unit 121 may also control the overall operations of one or more of the processing tools 105(1-n). The control unit 121 may be communicatively coupled to a storage unit 124. The APC framework 120, in the illustrated embodiment, includes one or more recipes 128(1-k). Generally, the processing tools 105(1-n) perform selected processing steps in accordance with the recipe 128 defined for the workpiece to be processed in the processing tool 105. In one embodiment, the processing tool 105 may have more than one recipe 128 associated therewith. For example, a processing tool 105 may perform selected processing steps on one workpiece according to a first recipe 128, and other processing steps on another workpiece according to a second recipe 128.

The APC framework 120, in one embodiment, includes one or more control algorithms 130 (shown as 130(1-*m*) in FIG. 1) to control the operation of one or more of the processing tools 105(1-*n*) that operate under the direction of a recipe 128. In one embodiment, the control algorithms 130(1-*m*) comprise a mathematical formula for calculating new recipe parameters based on the operational data received from the processing tools 105(1-*n*). The new recipe parameters aid the processing tools 105(1-*n*) in moving towards a desired result (or target) defined by the recipe 128.

Generally, the control algorithms 130(1-*m*) are adapted to automatically control the operating recipes of their respective processing tools 105(1-*n*). For example, if the processing tool 105 is a CMP tool, the control algorithm 130 may receive pre-polish thickness measurements (e.g., thickness of high features, thickness of low features) and predict a polishing time required to achieve a post-polish target thickness. The control algorithm 130 may use a performance model of the processing tool 105 to generate its prediction. In the case where the processing tool 105 is an etch tool, the control algorithm 130 may model the etching performance of the processing tool 105 based on pre-etch and/or post-etch thickness measurements. Using the model, the control algorithm 130 may determine operating recipe parameters such as etch time, plasma power, temperature, pressure, reactant gas concentrations, etc. to reduce post-etch thickness variations. Other control scenarios are possible with other types of processing tools 105(1-*n*).

The APC framework 120, in the illustrated embodiment, includes one or more business rules 136 (shown as 136(1-*p*) in FIG. 1) to apply to one or more of the processing tools 105(1-*n*). Generally, a business rule 136 represents a logical rule for running one or more of the processing tools 105(1-*n*). Examples of a business rule 136 may include making an adjustment to a calculated recipe parameter based on a particular type of processing tool 105 being employed, processing a particular type of workpiece over another, based on business needs, and selectively operating processing tools 105(1-*n*) during certain times. Another example of a business rule 136 may include performing a preventative maintenance procedures on a processing tool 105 at selected intervals or after a preselected number of workpieces have been processed by the processing tool 105. For example, depending on the nature of the maintenance desired, a preventative maintenance procedure may include changing a lamp in a processing tool 105 after it processes 1000 (one thousand) workpieces, cleaning a sink of a processing tool 105 every 200 hours, replacing or conditioning polishing pads in a processing tool 105 at preselected intervals, and the like.

The term "preventative maintenance event" is utilized in this discussion to refer to one of a variety of discrete maintenance acts occurring in the processing tool 105, wherein the maintenance may be performed, for example, on a regular basis er sporadic basis, depending on the particular implementation. In one embodiment, a preventative maintenance event may occur in response to a disturbance. For example, a preventative maintenance event may occur after a drift is detected in the processing tool 105 due to offline monitoring of the tool performance or inline monitoring of the processing tool 105 performance or process behavior. In such instances, the preventative maintenance events are not necessarily scheduled but unscheduled and occur because an unexpected change was detected. Thus, for example, if a spike in the performance results of the processing tool 105 is detected, it may be determined that the spike may have been due to an open door on the processing tool 105, and when an open door occurs, a technician should clean selected components of the processing tool 105 before bringing it online. When the processing tool 105 returns to an operational state, a different control algorithm 130 may be applied because the processing tool 105 was down for a preselected number of hours.

Although the recipes 128(1-*k*), control algorithms 130(1-*m*) and the business rules 136(1-*p*) are shown as residing in the APC framework 120 in the illustrated embodiment, in an alternative embodiment, the recipes 128(1-*k*), control algorithms 130(1-*m*) and business rules 136(1-*p*) may be implemented in a variety of components, including the equipment interface 110, the processing tool 105, and the like.

As described in more detail below, one or more embodiments of the present invention select one or more control algorithms 130(1-*m*) for controlling the processing tools 105(1-*n*) based on a business rule 136. Various business rules 136(1-*p*), which may include tool events such as maintenance procedures (e.g., chamber cleaning, polishing pad conditioning, consumable item replacement), calibrations, etc., may affect the operating characteristics of the processing tool 105, thus causing difficulty for the control algorithm 130 in maintaining stability in the processing steps. In some instances, it may take the control algorithm 130 numerous iterations to account for the operating characteristic change due to the tool event. Product processed during the interim may be defective. Accordingly, in accordance with one or more embodiments of the present invention, one or more control algorithms 130(1-*m*) are selected to control the processing tools 105(1-*n*) based on the applied business rule 136.

It should be appreciated that the illustrated components shown in the block diagram of the system 100 in FIG. 1 are illustrative only, and that, in alternative embodiments, additional or fewer components may be utilized without deviating from the spirit or scope of the invention. For example, in one embodiment, the one or more processing tools 105(1-*n*) may not have an associated sensor 115. Additionally, it should be noted that although various components, such as the equipment interface 110 of the system 100 of FIG. 1 are shown as stand-alone components, in alternative embodiments, such components may be integrated into the processing tool 105.

Figure 2:
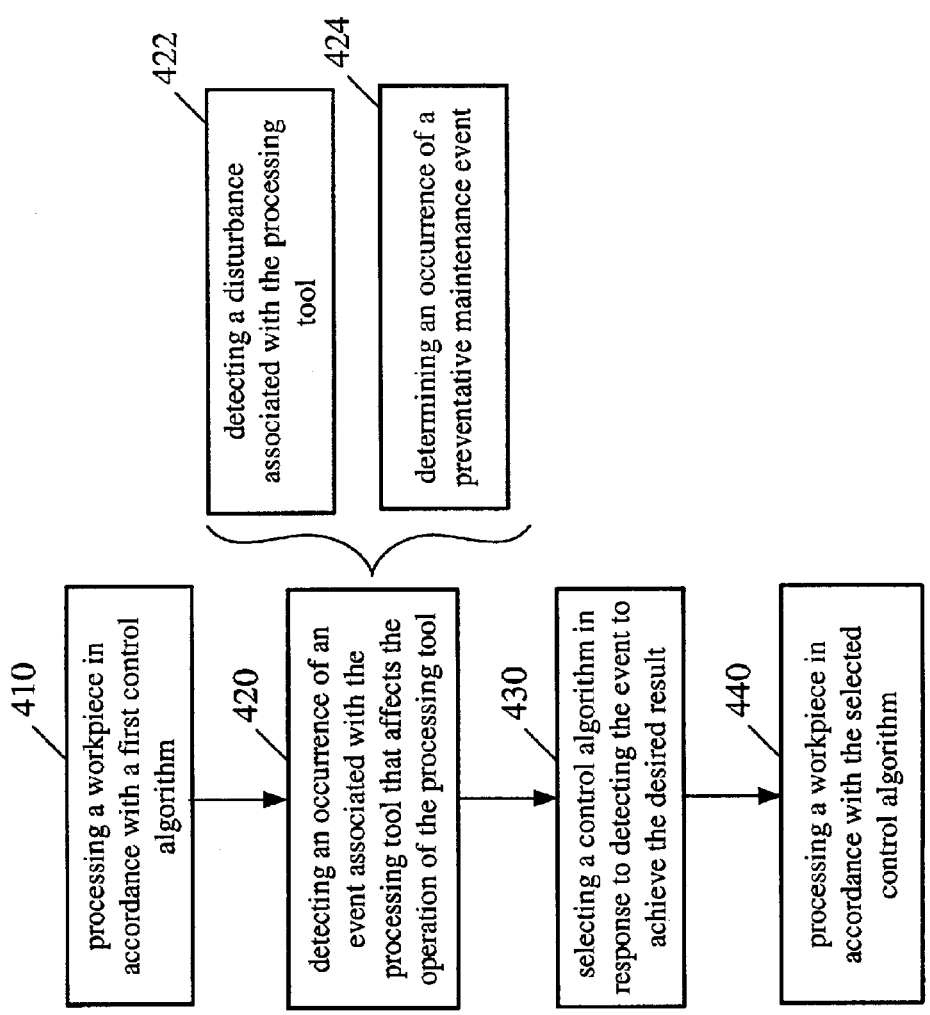
FIG. 2 depicts a flow diagram of a method that may be implemented in the manufacturing system of FIG. 1, in accordance with one embodiment of the present invention.

Referring now to FIG. 2, a flow diagram of a method that may be implemented in the manufacturing system 100 of FIG. 1 is illustrated, in accordance with one embodiment of the present invention. A processing tool 105 processes (at 410) a workpiece under a direction of a recipe 128 in accordance with a first control algorithm 130. As mentioned, a "control algorithm" receives operational data from the processing tool 105 and calculates new recipe parameters based on the received operational data. The new recipe parameters are provided to the processing tool 105 so that process adjustments can be made to move toward the desired results that are defined by the recipe 128.

An event associated with the processing tool 105 that affects the operation of the processing tool 105 is detected (at 420). An event may affect the operation of the processing tool 105, for example, if it has the potential for affecting the operating characteristics of the processing tool 105. The type of event that is detected (at 420) may vary depending on the implementation. For example, in one embodiment, a disturbance may be associated with the processing tool 105 detected (at 422), where the disturbance may have caused the processing tool 105 to process differently even though no significant change is made to the recipe. As an added example, detecting the event (at 420) may comprise determining (at 424) an occurrence of a preventative maintenance event. These various types of events, in one embodiment, may be defined by the business rules 136(1-p) (see FIG. 1). As mentioned, a variety of other business rules 136(1-p) may be defined to control the operation of the processing tool 105.

In response to detecting the event (at 420), a control algorithm 130 is selected (at 430) to achieve the desired result. Selection of the control algorithm 130 (at 430) depends on which of the defined control algorithms 130(1-m) is able to more effectively achieve the desired results set forth by the recipe 128. In one embodiment, the particular control algorithm 130 selected (at 430) depends on the business rule 136 defined for the processing tool 105. For example, a business rule 136 calling for a preventative maintenance 7-day cycle may employ a different control algorithm 130(1-m) following the preventative maintenance cycle, as the control algorithm 130 may be better able to account for process variations in the processing tool 105 due to the preventative maintenance.

The processing tool 105 processes (at 440) a workpiece in accordance with the selected (at 430) control algorithm 130. The selected control algorithm 130 (at 430) is able to more efficiently and quickly adapt to the process variations in the processing tool 105. Accordingly, it may be possible to achieve the desired results more efficiently in accordance with the controlling recipe 128. This, in turn, may result in increased overall accuracy, throughput, reliability, and the like of the manufacturing system 100.

Figure 3:
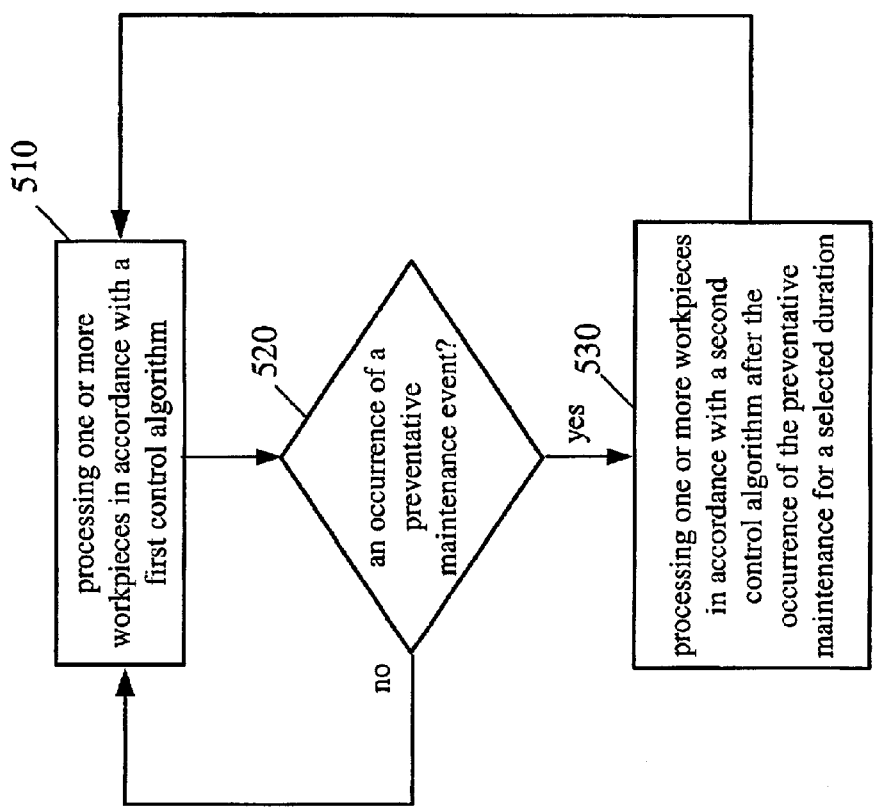
FIG. 3 illustrates a flow diagram of an alternative method that may be implemented in the manufacturing system of FIG. 1, in accordance with one embodiment of the present invention.

Referring now to FIG. 3, a flow diagram of an alternative method that may be implemented in the manufacturing system 100 of FIG. 1 is illustrated, in accordance with one embodiment of the present invention. A processing tool 105 processes (at 510) one or more workpieces under control of a recipe 128 in accordance with a first control algorithm 130. The control unit 121 determines (at 520) whether a preventative maintenance event associated with the processing tool 105 has occurred. If there is no occurrence of the preventative maintenance event, then the processing tool 105 continues to process (at 510) one or more of the workpieces under the control of the recipe 128 in accordance with a first control algorithm 130.

If it is determined that a preventative maintenance event has occurred (at 520), then the control unit 121 causes the processing tool 105 to process (at 530) one or more workpieces in accordance with a second control algorithm 130 for a selected duration. In one embodiment, the "selected duration" may be defined by the number of lots or workpieces that are processed (at 530) by the processing tool 105 using the second control algorithm 130. For example, the second control algorithm 130 may be employed by the first ten lots after the occurrence of the preventative maintenance event. Upon expiration of the selected duration, the processing tool 105 once again reverts to processing (at 510) one or more workpieces in accordance with the first control algorithm 130. The above-described method may be repeated, in one embodiment, each time a preventative maintenance event is detected.

In the illustrated embodiment of the method of FIG. 3, two different control algorithms 130 are employed, one before and the other after the occurrence of the preventative event. After a selected amount of time following the preventative maintenance event, the first control algorithm 130 may once again be employed. Thus, in one embodiment, the first control algorithm 130 is employed during times the processing has stabilized in the processing tool 105, and the second control algorithm 130 is employed during a transitional phase, following the preventative maintenance event. This added flexibility of selecting different control algorithms 130 based on business rules 136 allows the processing tool 105 to more efficiently move toward the desired results defined by the recipe.

The various system layers, routines, or modules may be executable by the control unit 121 (see FIG. 1). As utilized herein, the term "control unit" may include a microprocessor, a microcontroller, a digital signal processor, a processor card (including one or more microprocessors or controllers), or other control or computing devices. The storage unit 124 (see FIG. 1) referred to in this discussion may include one or more machine-readable storage media for storing data and instructions. The storage media may include different forms of memory including semiconductor memory devices such as dynamic or static random access memories (DRAMs or SRAMS), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:

processing a workpiece using a processing tool, wherein the processing tool is capable of processing the workpiece under a control of at least a first and a second control algorithm at any given time, and wherein the algorithms are adapted to determine one or more recipe parameters;

detecting an occurrence of a preventative maintenance event; selecting at least one of the first and second control algorithm based on detecting the occurrence of the event; and processing a workpiece using the processing tool in accordance with the selected control algorithm.

2. The method of claim 1, wherein processing the workpiece in accordance with the selected control algorithm comprises processing the workpiece in accordance with the second control algorithm.

3. The method of claim 2, wherein processing the workpiece in accordance with the second control algorithm comprises processing the workpiece in accordance with the second control algorithm for a selected time interval based on detecting the occurrence of the preventative maintenance event.

4. The method of claim 3, further comprising processing a workpiece in accordance with the first control algorithm upon expiration of the selected time interval.

5. The method of claim 1, wherein detecting the occurrence of the event further comprises detecting a disturbance associated with the processing tool.

6. The method of claim 1, wherein detecting the occurrence of the event further comprises detecting a fault associated with the processing tool.

7. The method of claim 1, wherein the first and second algorithm comprise a mathematical equation, and wherein processing the workpiece in accordance with the selected control algorithm comprises receiving operational data from the processing tool, applying the data to the mathematical equation to obtain at least one parameter, and applying the at least one parameter to control the processing tool.

8. The method of claim 1, wherein processing the workpiece in accordance with the selected control algorithm comprises processing a semiconductor device.

9. An apparatus, comprising:
an interface; and
a control unit communicatively coupled to the interface, the control unit adapted to:
operate a processing tool in accordance with a business rule;
select a control algorithm from at least two available control algorithms to control the operation of the processing tool based on the business rule, wherein the control algorithms are adapted to determine one or more recipe parameters;
process a workpiece in the processing tool in accordance with the selected control algorithm for a preselected time interval and adapted to select another available control algorithm after the expiration of the preselected time interval; and
perform a preventative maintenance on the processing tool.

10. The apparatus of claim 9, wherein the control unit is adapted to detect a disturbance in a processing of the workpiece that is larger than a preselected percentage.

11. The apparatus of claim 9, wherein the selected control algorithm comprises a mathematical equation, and wherein the control unit is further adapted to receive operational data from the processing tool, apply the data to the mathematical equation to obtain results, and apply the results to control the processing tool.

12. The apparatus of claim 9, wherein the control unit is adapted to process a semiconductor device.

13. An article comprising one or more machine-readable storage media containing instructions that when executed enable a processor to:
process a workpiece using a processing tool under a control of a first control algorithm that is capable of determining one or more recipe parameters;
detect an occurrence of a preventative maintenance event;
select a second control algorithm based on detecting the occurrence of the event, wherein the second control algorithm is capable of determining one or more recipe parameters; and
process a workpiece in the processing tool under a control of the second control algorithm, wherein the processing tool is capable of processing under the control of at least one of the first control algorithm and the second control algorithm at any given time.

14. The article of claim 13, wherein the instructions when executed enable the processor to process the workpiece in the processing tool under the control of the second control algorithm for a selected time interval.

15. The article of claim 14, wherein the instructions when executed enable the processor to process the workpiece under the control of the first control algorithm upon expiration of the selected time interval.

16. The article of claim 13, wherein the instructions when executed enable the processor to detect a disturbance associated with the processing tool.

17. The article of claim 13, wherein the instructions when executed enable the processor to receive operational data from the processing tool, apply the data to a mathematical equation to obtain results, and apply the results to control the processing tool.

18. A system, comprising:
a processing tool; and
an advanced process control (APC) framework communicatively coupled to the processing tool, the APC framework adapted to:
operate a processing tool in accordance with a business rule;
select a control algorithm from at least two available control algorithms to control the operation of the processing tool based on the business rule, wherein the algorithms are capable of determining one or more recipe parameters;
process a workpiece in the processing tool in accordance with the selected control algorithm for a preselected time interval and adapted to select another available control algorithm after the expiration of the preselected time interval; and
perform a preventative maintenance on the processing tool.

19. The system of claim 18, wherein the APC framework is further adapted to receive operational data from the processing tool, apply the data to a mathematical equation to obtain results, and apply the results to control the processing tool.

20. An apparatus, comprising:
means for processing a workpiece using a processing tool, wherein the processing tool is capable of processing the workpiece under a control of at least a first and a second control algorithm at any given time, wherein the control algorithms are capable of determining at least one or more recipe parameters;
means for detecting an occurrence of a preventative maintenance event associated with the processing tool;
means for selecting at least one of the first and second control algorithm based on detecting the occurrence of the event; and
means for processing a workpiece using the processing tool in accordance with the selected control algorithm.

* * * * *